(12) United States Patent
O'Rourke et al.

(10) Patent No.: US 7,146,419 B1
(45) Date of Patent: Dec. 5, 2006

(54) SYSTEM AND METHOD FOR MONITORING A STATE ASSOCIATED WITH A GENERAL PACKET RADIO SERVICE SUPPORT NODE

(75) Inventors: Chris O'Rourke, Apex, NC (US); Ashish A. Chandwadkar, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 798 days.

(21) Appl. No.: 10/305,520

(22) Filed: Nov. 26, 2002

(51) Int. Cl.
*G06F 15/16* (2006.01)
*G06F 15/173* (2006.01)

(52) U.S. Cl. .............. 709/224; 709/226; 709/229; 709/234

(58) Field of Classification Search ............ 709/224, 709/227, 234; 370/329, 352
See application file for complete search history.

(56) References Cited

U.S. PATENT DOCUMENTS

| | | | |
|---|---|---|---|
| 5,185,860 A | 2/1993 | Wu | 395/200 |
| 5,479,404 A | 12/1995 | Francois et al. | 370/84 |
| 5,490,252 A | 2/1996 | Macera et al. | 395/200.01 |
| 5,651,007 A | 7/1997 | Warren et al. | 370/431 |
| 5,931,961 A | 8/1999 | Ranganathan et al. | 714/712 |
| 6,748,434 B1* | 6/2004 | Kavanagh | 709/224 |
| 2001/0050907 A1* | 12/2001 | Madour et al. | 370/329 |
| 2002/0013854 A1* | 1/2002 | Eggleston et al. | 709/234 |
| 2002/0073338 A1* | 6/2002 | Burrows et al. | 709/224 |
| 2003/0002480 A1* | 1/2003 | Giustina et al. | 370/352 |
| 2004/0093415 A1* | 5/2004 | Thomas | 709/227 |

* cited by examiner

*Primary Examiner*—Rupal Dharia
*Assistant Examiner*—Quang N. Nguyen
(74) *Attorney, Agent, or Firm*—Baker Botts L.L.P.

(57) ABSTRACT

A method for monitoring a state associated with a support node is provided that includes receiving one or more communication flows from a first support node, the first support node communicating a message to a second support node that propagates through a loadbalancer. Activity associated with the second support node is then monitored. The method also includes removing one or more communications tunnels associated with the second support node when the second support node does not respond to the message communicated by the first support node.

18 Claims, 2 Drawing Sheets

| 28 | 54 | 56 | 58 | 60 |
|---|---|---|---|---|
| | IP ADDRESS | GSN TYPE | RECOVERY I.E. | TIMER |
| STEP A | GGSN #_ | GGSN | X (e.g. LATER CHANGES TO Z) | 30 SECONDS |
| STEP B | SGSN #_ | SGSN | Y | 30 SECONDS |

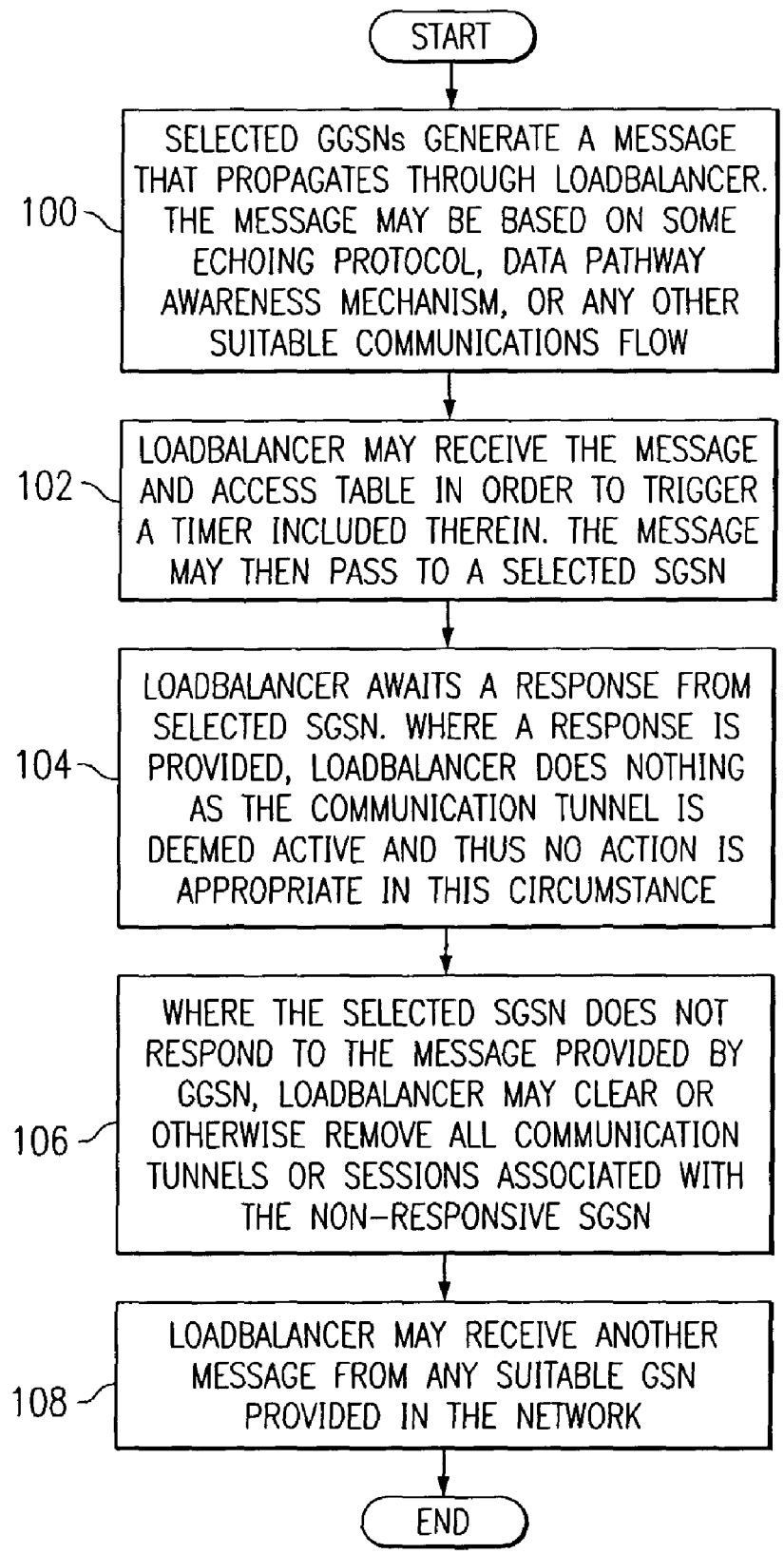

SYSTEM AND METHOD FOR MONITORING A STATE ASSOCIATED WITH A GENERAL PACKET RADIO SERVICE SUPPORT NODE

TECHNICAL FIELD OF THE INVENTION

This invention relates in general to the field of communications and more particularly to a system and method for monitoring a state associated with a general packet radio service support node.

BACKGROUND OF THE INVENTION

Networking architectures have grown increasingly complex in communications environments. In addition, the augmentation of clients or end users wishing to communicate in a network environment has caused many networking configurations and systems to respond by adding elements to accommodate the increase in networking traffic. Communication tunnels may be used in order to establish or to gain access to a network, whereby an end user or an object may initiate a tunneling protocol by invoking a selected location or a network node. The network node or central location may then provide a platform that the end user may use to conduct a communication session.

As the subscriber base of end users increases, proper routing and efficient management of communication sessions and data flows become even more critical. Some communication sessions or tunnels are stagnant in a network and remain unused by end users. Such dormancy may be caused by network providers attempting to offer always-on service to its clients or customers. These inactive channels may decrease throughput and inhibit the flow of network traffic, causing congestion or bottlenecks in the system. Additionally, the overwhelming number of stale communications tunnels may decrease bandwidth capabilities as a burdened component is required to maintain communication sessions or tunnels that are not being used. This further prohibits the network from offering additional communication tunnels or accommodating additional end users. Such a scenario reflects poor resource allocation in the network and operates to tax network equipment with tasks that are generally inconsequential to communications in the architecture.

SUMMARY OF THE INVENTION

From the foregoing, it may be appreciated by those skilled in the art that a need has arisen for an improved communications approach that provides for a reduction in the burden placed on a loadbalancer associated with communications between two end points or nodes. In accordance with one embodiment of the present invention, a system and method for monitoring a state associated with a support node are provided that greatly reduce disadvantages and problems associated with conventional loadbalancing techniques.

According to one embodiment of the present invention, there is provided a method for monitoring a state associated with a support node that includes receiving one or more communication flows from a first support node, the first support node communicating a message to a second support node that propagates through a loadbalancer. Activity associated with the second support node is then monitored. The method also includes removing one or more communications tunnels associated with the second support node when the second support node does not respond to the message communicated by the first support node.

Certain embodiments of the present invention may provide a number of technical advantages. For example, according to one embodiment of the present invention a communications approach is provided that allows a loadbalancer to clear or otherwise remove communication sessions or tunnels that are not being used. This reduction in responsibility for the loadbalancer operates to increase throughput and bandwidth because the loadbalancer is relieved from a significant amount of dormant tunnels. Accordingly, the loadbalancer may be involved in only active communication tunnels to allow maximum bandwidth capabilities to be reached.

Yet another technical advantage of one embodiment of the present invention is the result of the removal of communication tunnels that are stagnant in the network. This flushing of communication tunnels operates to better allocate network resources because only active data pathways are maintained by the network equipment. This further simplifies the network configuration and allows for a more efficient use of network components and elements. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 3 is a flowchart illustrating a series of example steps associated with a method for communicating data in a loadbalancing environment.

DETAILED DESCRIPTION OF THE INVENTION

Figures 1, 2:
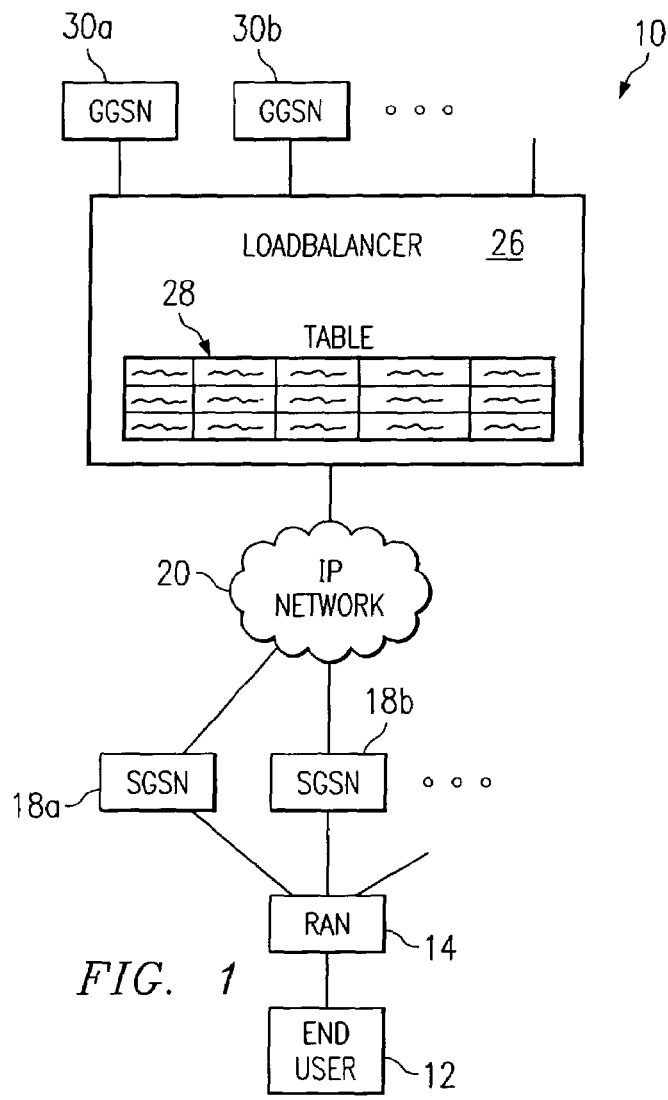
FIG. 1 is a simplified block diagram of a communications system for communicating data in a loadbalancing environment in accordance with one embodiment of the present invention.
FIG. 2 is a simplified block diagram of a table included within a loadbalancer of the communication system.

FIG. 1 is a simplified block diagram of a communication system 10 for communicating data in a network environment. Communication system 10 includes an end user 12, a radio access network (RAN) 14, multiple serving general packet radio service (GPRS) support nodes (SGSN) 18a and 18b, and an internet protocol (IP) network 20. Additionally, communication system 10 includes a loadbalancer 26 and multiple gateway GPRS support nodes (GGSNs) 30a–b. Loadbalancer 26 may include a table 28 operable to store data associated with communication sessions involving SGSNs 18a and 18b and GGSNs 30a and 30b.

Communication system 10 may be generally configured or arranged to represent a 2.5G communication architecture applicable to a Global System for Mobile (GSM) environment in accordance with a particular embodiment of the present invention. However, the 2.5G architecture is offered for purposes of example only and may alternatively be substituted with any suitable networking protocol or arrangement that provides a communicative platform for communication system 10. For example, communication system 10 may cooperate with any version of a GPRS tunneling protocol (GTP). This may also be inclusive of 3G architectures that provide a configuration allowing loadbalancer 26 to glean some piece of information associated with a selected GSN.

In accordance with the teachings of the present invention, communication system 10 operates to alleviate the burden on loadbalancer 26 by removing communication tunnels that are dormant in communication system 10. These stagnant communication tunnels may be cleared such that they no longer tax loadbalancer 26. The removal of inactive communications tunnels may be accomplished by loadbalancer 26 passively monitoring the specification defined path verification messages that may be sent between SGSNs 18*a* and 18*b* and GGSNs 30*a* and 30*b*. Monitoring communication sessions, such as path verification echo messages for example, may allow loadbalancer 26 to detect a failed GSN by keeping track of echo activity.

A GSN failure may be detected when mandatory echoing is not seen for a period of time or the recovery information that may be included in the echo messages changes. Loadbalancer 26 may respond to these scenarios by cleaning up persistent records for GTP tunnels associated with mobile users on the failed GSNs. This may be accomplished in cooperation with table 28 without requiring subscriber heartbeats, keepalives, or any other signaling protocol or message used to assist in this execution. Thus, an accurate session table 28 may be used to conserve resources associated with loadbalancer 26 by cleaning up failed or inconsequential communication sessions in a timely manner. Additionally, by not requiring subscriber keepalives or other elements, air interfaces may be conserved to increase bandwidth for communication system 10.

The passive monitoring approach provided by loadbalancer 26 allows a flushing or clearing of communication sessions or tunnels that are not being used. This data structure optimization in the loadbalancer 26 operates to increase throughput because a significant amount of dead tunnels may be removed from loadbalancer 26. Accordingly, loadbalancer 26 may be involved in only active communication tunnels. The flushing of communication tunnels may also operate to better allocate network resources because only active data pathways are maintained by the network equipment. This further simplifies the network configuration of communication system 10 and allows for a more efficient use of network components and elements.

End user 12 is a client or a customer wishing to initiate a communication tunnel in communication system 10 via IP network 20. End user 12 may be inclusive of devices used to initiate a communication, such as a computer, a personal digital assistant (PDA), a laptop or electronic notebook, a telephone, a mobile station, or any other device, component, element, or object capable of initiating voice or data exchanges within communication system 10. End user 12 may also be inclusive of a suitable interface to the human user, such as a microphone, a display, a keyboard, or other terminal equipment (such as for example an interface to a personal computer or to a facsimile machine in cases where end user 12 is used as a modem). End user 12 may also be any device that seeks to initiate a communication on behalf of another entity or element, such as a program, a database, or any other component, device, element, or object capable of initiating a voice or a data exchange within communication system 10. Data, as used herein in this document, refers to any type of numeric, voice, or script data, or any type of source or object code, or any other suitable information in any appropriate format that may be communicated from one point to another.

RAN 14 is a communications interface between end user 12 and SGSNs 18*a* and 18*b*. RAN 14 may comprise a base transceiver station and a base station controller. The communications interface provided by RAN 14 allows data to be exchanged between end user 12 and any number of selected elements within communication system 10. RAN 14 facilitates the delivery of a request packet generated by end user 12 and the reception of information sought by end user 12. RAN 14 is only one example of a communications interface between end user 12 and SGSNs 18*a* and 18*b*. Other types of communications interfaces may be used for any particular network design.

IP network 20 represents a series of points or nodes of interconnected communication paths for receiving and transmitting packets of information that propagate through communication system 10. IP network 20 offers a communicative interface between end user 12 and selected GGSNs 30*a*–*b* and may be any local area network (LAN), wireless local area network (WLAN), metropolitan area network (MAN), wide area network (WAN), or any other appropriate architecture or system that facilitates communications in a network environment. IP network 20 implements a user datagram protocol (UDP)/internet protocol (UDP/IP) communication language protocol in a particular embodiment of the present invention. However, IP network 20 may alternatively implement any other suitable communication protocol for transmitting and receiving data packets within communication system 10.

SGSNs 18*a* and 18*b* and GGSNs 30*a* and 30*b* cooperate in order to facilitate a communication session involving end user 12. GGSNs 30*a*–*b* are communications nodes operating in a GPRS environment that may be working in conjunction with multiple SGSNs 18*a* and 18*b* to provide a communications medium in a GPRS service network environment for communicating high-speed data exchanges within communication system 10. GGSNs 30*a* and 30*b* may be inclusive of a walled garden or any other suitable mechanism that a network operator may choose to implement in providing some connectivity for the network. GPRS represents a packet-based data bearer service for communication services that may be delivered as a network overlay for any type of suitable network configuration or platform. GPRS generally applies packet-radio and packet switching principles to transfer data packets in an efficient way between GSM elements or units and external packet data networks. Packet switching occurs when data is split into packets that are transmitted separately and then reassembled at a receiving end. GPRS may support multiple internet communication protocols and may enable existing IP, X.25, or any other suitable applications or platforms to operate over GSM connections.

Loadbalancer 26 is an element or a device that receives requests and then distributes those requests to the next available server or node. The available server or node may be any computer, component, or device on a network that manages network resources or that processes data. Such loadbalancing decisions may be executed based on suitable algorithms or software provided in loadbalancer 26. Loadbalancer 26 may also include hardware and/or software for directing signaling and data information in communication system 10.

Loadbalancer 26 may also perform other suitable loadbalancing tasks, such as dividing of the amount of work that an element has to do between two or more elements such that more work gets done in the same amount of time and, in general, end user 12 may be served more quickly. Loadbalancer 26 may include any appropriate hardware, software, a combination of both, or any appropriate component, device, element, or object that suitably manages information traffic in a network environment. Additionally, any of the operations of SGSNs 18a–b or GGSNs 30a–b may be assisted by loadbalancer 26 where appropriate and in accordance with particular needs.

In operation, loadbalancer 26 may execute loadbalancing decisions for selected GGSNs 30a–b. Loadbalancer 26 may recognize a substantial number of dormant communication tunnels that have been established in association with GGSNs 30a and 30b and SGSNs 18a and 18b. As the number of end users or subscribers grow, it becomes necessary to distribute GTP tunnels across several GGSNs 30a and 30b. This loadbalancing may be accomplished by loadbalancer 26 which assigns each GTP tunnel to a particular GGSN 30a or 30b. This assignment may be maintained as a persistent record in loadbalancer 26 and used to deliver subsequent GTP messages for this tunnel to an assigned GGSN 30a or 30b and to accurately determine the number of sessions on a particular GGSN in providing optimal loadbalancing.

Some network providers may seek to offer always-on services to end users. Using such a plan, end user 12 may bring up a GTP tunnel and send no traffic over that tunnel for long periods of time (note that most GTP protocols may not have per-tunnel keepalive mechanisms). While the tunnel is open (whether active or inactive), loadbalancer 26 may continue to store the persistent record of its GSN assignment. However, in cases where any GSN fails, loadbalancer 26 may be wasting its resources on stagnant communication tunnels that remain inactive in the architecture.

Loadbalancer 26 obviates the problem of inactive tunnels by making itself aware of failed GSNs or communication tunnels that are no longer needed. This detection by loadbalancer 26 operates to conserve network resources and to avoid leaking memory as loadbalancer 26 checks on the status or health of each GSN to which it is connected. This may be accomplished by passively monitoring communication flows such as echo communications or recovery information element changes in communication messages between nodes in the network. In this manner, loadbalancer 26 may keep track of active GGSNs 30a or 30b and active SGSNs 18a and 18b. Information relating to this monitoring may be stored in any suitable location, such as table 28 for example.

In operation where loadbalancer 26 witnesses a GSN not respond to an echo message (e.g. by using a timer), table 28 may be cleaned accordingly of tunnels associated with that non-responsive GSN. This same type of monitoring may also be used to determine a failure of a GSN in the network. The echoing protocol may be bi-directional and therefore monitoring may be executed in either direction. The echoing protocol may be on the same path as signaling communications. It may further operate on the same port but not necessarily specific to a particular network node.

Thus, signaling parsing may be executed in order to inform loadbalancer 26 of the status of all GSNs in a network. Additionally, a reload detection feature may be provided by this monitoring. Participating GSN elements in the network may be required by some specification to echo their peer in order to determine path awareness. Loadbalancer 26 is positioned in the middle of this signaling pathway and may take advantage of this positioning by watching, gleaning, or otherwise monitoring the health of all GSNs in the network based on their responses. Such monitoring does not inhibit communication flows as loadbalancer 26 is already inspecting packets in order to verify what type of information is being received. For example delete, create, update, echo, or any other suitable message may be generated and thereafter propagate through loadbalancer 26. Loadbalancer 26 is generally a focal point of the network and may accordingly view the health of all GSNs by gleaning information that it already receives.

FIG. 2 is a simplified block diagram of table 28 in accordance with one embodiment of the present invention. Table 28 may be provided internal to loadbalancer 26 or provided external to loadbalancer 26 and suitably coupled thereto. Table 28 may include an IP address column 54, a GSN type column 56, a recovery information element (I.E.) column 58, and a timer column 60. Table 28 may be used in order to time responses to messages from selected GSNs in communication system 10. Table 28 may be suitably created by loadbalancer 26 or appropriately configured or designed in accordance with particular needs.

In operation, at step A of table 28, an entry may be placed into table 28 that indicates an IP address associated with a selected GSN. The entry may include the GSN type, its associated recovery information element, and a timer element parameter, which may be coordinated with GTP parameters. The recovery information element may operate as a reset counter and offer information concerning how many times a particular element may be used. At this point, because loadbalancer 26 has seen activity from some GSN in the network (potentially submitted pursuant to an echoing protocol) the timer may be set. The timer may be any suitable timing element included within or accessible by table 28. In one embodiment, the timing element is included in software within loadbalancer 26.

When the timer expires, this may translate into the non-responsive GSN being dead or otherwise dysfunctional because it has not provided an appropriate response. Accordingly, table 28 may be cleaned of entries associated with that non-responsive GSN, i.e. those connections which point to the failing GSN. Because that GSN is now gone from table 28, it may be deemed as failed and removed from a loadbalancing algorithm provided in loadbalancer 26 for some designated period of time before it is returned.

At step B, table 28 may be updated or an additional entry may be generated. Where a timer associated with a selected SGSN 18a or 18b expires, the only action generally required is to clean up SGSN connections because it represents the client. The recovery information element may be tracked because, in cases where it changes, all connections associated with that GSN may be removed. This represents another feature that may be provided to table 28 in accordance with one embodiment. An example scenario illustrating this capability is provided in FIG. 2 for purposes of teaching. Recovery information element column 58 indicates a recovery information element of 'x' that later changes to 'z.' Thus, when a GSN provides a communication flow that indicates a recovery information element of 'z' it reflects a specification defined behavior whereby all communication tunnels may be removed because the recovery information element has changed.

Table 28 may also behave in an appropriate corresponding fashion where an SGSN object is the first element created in table 28. Thus, where echo activity is received from a selected SGSN 18a or 18b, an SGSN object may be built first and a GGSN object built second in table 28. Two timers may then be set whereby, if the timers expire, then the corresponding appropriate action may be taken. On an SGSN timer expiration, all connections associated with that SGSN may be removed. On a GGSN timer expiration, all communication sessions or tunnels may be cleared that are associated with that non-responsive GGSN. In addition, loadbalancer 26 may fail the corresponding real IP address element (from a loadbalancing perspective). The real IP address element is chosen when a loadbalancing decision is executed. Additionally, loadbalancer 26 may withhold any new connections for a failing GGSN for a specific time interval in accordance with particular needs.

In another example scenario, any selected GSN may send a delete request to loadbalancer 26. The delete request may indicate to remove or to tear down designated communication sessions or tunnels. This may be effectuated using any suitable mechanism, such as a tear down indicator included in the message. Loadbalancer 26 may inspect this communication flow and accordingly respond by tearing down appropriate tunnels and cleaning table 28. Table 28 may then be suitably flushed after an appropriate timeout period. Such a scenario addresses another problem, when objects per protocol data packet (PDP) are maintained in loadbalancer 26 and delete messages are expected in each direction. Table 28 may be implemented to flush selected objects on a GSN timeout because loadbalancer 26 may not see the delete messages in cases where a selected GGSN 30a or 30b recognizes that a selected SGSN 18a or 18b is no longer responding. This may be the case where a recovery information element has changed and a selected GGSN 30a or 30b has recognized this change and thus corresponding communication tunnels are appropriately removed. Thus, there is no need to offer a delete request where a reload has been executed. Additional echoing messages generated by any element in the network are problematic because they may encounter coordination problems.

FIG. 3 is a flowchart illustrating a series of example steps associated with a method for communicating data in communication system 10. The method begins at step 100, where a selected GGSN 30a or 30b generates a message that propagates through loadbalancer 26. The message may be based on some echoing protocol, data pathway awareness mechanism or any other suitable communication flow. At step 102, loadbalancer 26 may receive the message and access table 28 in order to restart a timer included therein. The message may then pass to a selected SGSN 18a or 18b. At step 104, loadbalancer 26 awaits a response from SGSN 18a or 18b. Where a response is provided, loadbalancer 26 does nothing as the communication path is deemed active and thus no action is appropriate in this circumstance.

Where a selected SGSN 18a or 18b does not respond to the message provided by GGSN 30a or 30b, at step 106 loadbalancer 26 may clear or otherwise remove all communication tunnels or sessions associated with the non-responsive SGSN 18a or 18b. At step 108, loadbalancer 26 may receive another message from any suitable GSN provided in the network. Loadbalancer 26 may then accordingly repeat this procedure in order to accurately identify active and inactive communication sessions and tunnels associated with GSNs in the network.

Some of the steps illustrated in FIG. 3 may be changed or deleted where appropriate and additional steps may also be added to the flowchart. These changes may be based on specific communication architectures or particular interfacing arrangements and configurations of associated elements and do not depart from the scope or the teachings of the present invention.

Although the present invention has been described in detail with reference to IP communications, communication system 10 may be used for any tunneling protocol involving the establishment or the removal of communications tunnels. Thus, any suitable communications that involve the creation of communication pathways between network nodes may benefit from the teachings of the present invention. The use of end user 12 and IP communications have only been offered for purposes of teaching and should not be construed to limit the scope of the present invention in any way.

In addition, communication system 10 may be extended to any scenario in which end user 12 is provided with mobility (in the context of a wired or a wireless connection or coupling) and communicates with some type of access server (e.g. a network access server (NAS), foreign agents, etc.). End user 12 may use a dedicated connection of some form or use forms of multiple access protocols where appropriate. Access may be associated with point to point protocol (PPP) or alternatively with layer three protocols over a layer two in accordance with particular needs. Such an embodiment may include any suitable tunnel terminators and/or tunnel initiators that may be operable to communicate with loadbalancer 26.

Additionally, although communication system 10 has been described with reference to echo communications, any suitable communications flows that pass through loadbalancer 26 may be used to glean the health of corresponding network elements. The use of echo communications has only been used for purposes of example and should not be construed to limit the scope of the present invention. Moreover, the use of GGSNs 30a and 30b and SGSNs 18a and 18b has similarly been offered for purposes of teaching only. Any network node that passes communication flows through loadbalancer 26 may have its status checked in accordance with the teachings of the present invention. Loadbalancer 26 may make removal decisions associated with communications tunnels based on the lack of a response offered by any network node being monitored.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. An apparatus for monitoring a state associated with a support node, comprising:
  a loadbalancer operable to receive one or more communications flows from a first support node and a second support node, the loadbalancer removing one or more communications tunnels associated with the second support node when the second support node does not respond to the message communicated by the first support node,
  wherein the loadbalancer includes a timing element operable to provide a selected time interval in which the second support node may respond to the message communicated by the first support node, and wherein the loadbalancer removes one or more of the communications tunnels associated with the second support node in response to expiration of the selected time interval, and
  wherein the loadbalancer includes a table operable to store information associated with each of the first and second support nodes, the table further operable to include parameters associated with the timing element and data relating to a recovery information element associated with one or more communications sessions initiated by each of the first and second support nodes.

2. The apparatus of claim 1, further comprising:
an echoing protocol that is included in each of the first and second support nodes, wherein the echoing protocol operates to provide signaling for path awareness between the first and second support nodes, the message communicated by the first support node being part of the echoing protocol.

3. The apparatus of claim 1, wherein the loadbalancer removes one or more of the communications tunnels associated with a selected one of the first and second support nodes when the loadbalancer detects that the recovery information element associated with a selected one of the first and second support nodes has changed.

4. The apparatus of claim 1, wherein the loadbalancer is operable to detect a reload condition of the first or second support nodes, the loadbalancer operable to remove one or more communications tunnels upon detection of the reload condition.

5. The apparatus of claim 1, wherein the loadbalancer is operable to receive a delete message from a selected one of the first and second support nodes, the delete message indicating to remove one or more designated communications tunnels associated with the selected support node, the loadbalancer operable to remove the designated communications tunnels in response to the delete message.

6. A method for monitoring a state associated with a support node, comprising:
receiving one or more communications flows from a first support node, wherein the first support node communicates a message destined for a second support node;
monitoring activity associated with the second support node;
removing one or more communications tunnels associated with the second support node when the second support node does not respond to the message communicated by the first support node;
initiating a timing element after the message is communicated, the timing element operable to provide a selected time interval in which the second support node may respond to the message communicated by the first support node;
removing one or more of the communications tunnels associated with the second support node upon expiration of the selected time interval; and
storing information associated with each of the first and second support nodes in a table, the table being operable to include parameters associated with the timing element and data relating to a recovery information element associated with one or more communications sessions initiated by each of the first and second support nodes.

7. The method of claim 6, further comprising:
providing a signaling protocol for path awareness between the first and second support nodes, the message communicated by the first support node being part of the signaling protocol.

8. The method of claim 6, further comprising:
monitoring the recovery information element associated with the first and second support nodes; and
removing one or more of the communications tunnels associated with a particular one of the first and second support nodes in response to a change in the associated recovery information element.

9. The method of claim 6, further comprising:
detecting a reload condition in a selected one of the first and second support nodes; and
removing one or more communications tunnels associated with the selected one of the first and second support nodes in response to detecting the reload condition.

10. The method of claim 6, further comprising:
receiving a delete message from a selected one of the first and second support nodes, the delete message indicating to remove one or more designated communications tunnels associated with the selected support node; and
removing the designated communications tunnels in response to the delete message.

11. A system for monitoring a state associated with a support node, comprising:
means for receiving one or more communications flows from a first support node, wherein the first support node communicates a message destined for a second support node;
means for monitoring activity associated with the second support node;
means for removing one or more communications tunnels associated with the second support node when the second support node does not respond to the message communicated by the first support node;
means for initiating a timing element after the message is communicated, the timing element operable to provide a selected time interval in which the second support node may respond to the message communicated by the first support node;
means for removing one or more of the communications tunnels associated with the second support node upon expiration of the selected time interval; and
means for storing information associated with each of the first and second support nodes in a table, the table being operable to include parameters associated with the timing element and data relating to a recovery information element associated with one or more communications sessions initiated by each of the first and second support nodes.

12. The system of claim 11, further comprising:
means for providing an echoing protocol for path awareness between the first and second support nodes, the message communicated by the first support node being part of the echoing protocol.

13. The system of claim 11, further comprising:
means for monitoring the recovery information element associated with the first and second support nodes; and
means for removing one or more of the communications tunnels associated with a selected one of the first and second support nodes in response to a change in the associated recovery information element.

14. The system of claim 11, further comprising:
means for detecting a reload condition in a selected one of the first and second support nodes; and
means for removing one or more communications tunnels associated with the selected one of the first and second support nodes in response to detecting the reload condition.

15. A computer-readable storage medium having computer-executable code for monitoring a state associated with a support node, operable to:
receive one or more communications flows from a first support node, wherein the first support node communicates a message destined for a second support node;
monitor activity associated with the second support node;

remove one or more communications tunnels associated with the second support node when the second support node does not respond to the message communicated by the first support node;

initiate a timing element after the message is communicated, the timing element operable to provide a selected time interval in which the second support node may respond to the message communicated by the first support node;

remove one or more of the communications tunnels associated with the second support node upon expiration of the selected time interval; and store information associated with each of the first and second support nodes in a table, the table being operable to include parameters associated with the timing element and data relating to a recovery information element associated with one or more communications sessions initiated by each of the first and second support nodes.

16. The computer-readable storage medium of claim 15, further operable to:

provide a signaling protocol for path awareness between the first and second support nodes, the message communicated by the first support node being part of the signaling protocol.

17. The computer-readable storage medium of claim 15, further operable to:

monitor the recovery information element associated with the first and second support nodes; and remove one or more of the communications tunnels associated with a selected one of the first and second support nodes in response to a change in the associated recovery information element.

18. An apparatus for monitoring a state associated with a support node, comprising:

a loadbalancer operable to receive one or more communication flows from a first support node and a second support node, wherein the first support node communicates a message to the second support node that propagates through the loadbalancer, the loadbalancer removing one or more communications tunnels associated with the second support node when the second support node does not respond to the message communicated by the first support node;

a timing element included within the loadbalancer and operable to provide a selected time interval in which the second support node may respond to the message communicated by the first support node, wherein if the timing element expires before the second support node responds to the message the loadbalancer removes one or more of the communications tunnels associated with the second support node, and wherein the loadbalancer is operable to detect a reload condition of the first or second support nodes, the loadbalancer operable to remove one or more communications tunnels upon detection of the reload condition; and a table included within the loadbalancer and operable to store information associated with each of the first and second support nodes, the table further operable to include parameters associated with the timing element and data relating to a recovery information element associated with one or more communication sessions initiated by each of the first and second support nodes.

* * * * *